(12) United States Patent
Blagsvedt et al.

(10) Patent No.: US 8,601,589 B2
(45) Date of Patent: Dec. 3, 2013

(54) SIMPLIFIED ELECTRONIC MESSAGING SYSTEM

(75) Inventors: Sean Olin Blagsvedt, Bangalore (IN); Vibhore Goyal, Bangalore (IN); Archana Prasad, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1498 days.

(21) Appl. No.: 11/694,654

(22) Filed: Mar. 30, 2007

(65) Prior Publication Data

US 2008/0222710 A1 Sep. 11, 2008

(30) Foreign Application Priority Data

Mar. 5, 2007 (IN) .............................. 482/DEL/2007

(51) Int. Cl.
*H04L 29/06* (2006.01)
(52) U.S. Cl.
USPC .................................. 726/26; 726/18; 726/19
(58) Field of Classification Search
USPC ........................................................... 726/26
See application file for complete search history.

(56) References Cited

U.S. PATENT DOCUMENTS

| | | | | |
|---|---|---|---|---|
| 5,895,468 | A * | 4/1999 | Whitmyer, Jr. | 705/26.1 |
| 5,963,913 | A * | 10/1999 | Henneuse et al. | 705/9 |
| 6,249,808 | B1 | 6/2001 | Seshadri | |
| 6,252,588 | B1 * | 6/2001 | Dawson | 715/752 |
| 6,282,435 | B1 * | 8/2001 | Wagner et al. | 455/566 |
| 6,295,058 | B1 | 9/2001 | Hsu et al. | |
| 6,460,075 | B2 | 10/2002 | Krueger et al. | |
| 6,507,643 | B1 | 1/2003 | Groner | |
| 6,633,630 | B1 | 10/2003 | Owens et al. | |
| 6,636,587 | B1 * | 10/2003 | Nagai et al. | 379/88.14 |
| 7,106,836 | B2 | 9/2006 | Neuhaus | |
| 2003/0122922 | A1 | 7/2003 | Saffer et al. | |
| 2004/0030934 | A1 * | 2/2004 | Mizoguchi et al. | 713/202 |
| 2004/0230843 | A1 * | 11/2004 | Jansen | 713/202 |
| 2006/0025164 | A1 | 2/2006 | Wang et al. | |
| 2006/0026537 | A1 | 2/2006 | L'Heureux | |
| 2006/0055673 | A1 | 3/2006 | Wu | |

(Continued)

FOREIGN PATENT DOCUMENTS

JP 2006-163825 A 6/2006
KR 1020050023747 A 3/2005

OTHER PUBLICATIONS

Katre, Dinesh, Using Mnemonic Techniques As Part of Pictorial Interface for Self-identifiaction of Illiterate Villagers, 2004.*

(Continued)

*Primary Examiner* — Mohammad L Rahman
(74) *Attorney, Agent, or Firm* — Perkins Coie LLP

(57) ABSTRACT

A simplified messaging system is provided. In various embodiments, the simplified messaging system receives a selection of an image representing an identification for a user that the user previously provided, receives a selection of multiple images representing a password for the user that the user previously selected, and logs the user into an electronic messaging system based on the selected images. In various embodiments, the simplified messaging system comprises a mail transport server that receives and forwards electronic messages, a mail registration server comprising an images component that stores images associated with user identifications and user passwords, and a mail client that receives a selection of an image identifying a user and multiple images associated with a password of the user, and logs the user into an electronic messaging system when the images are selected.

18 Claims, 14 Drawing Sheets

(56) References Cited

U.S. PATENT DOCUMENTS

2007/0074119 A1* 3/2007 Komine et al. ............... 715/743
2007/0266428 A1* 11/2007 Downes et al. ................... 726/5
2007/0277224 A1* 11/2007 Osborn et al. .................... 726/2

OTHER PUBLICATIONS

Chand, Aditya, Dey, K., Anind, Jadoo: A Paper User Interface for Users Unfamiliar with Computers, Apr. 22-27, 2006.*
Deo, S., Nichols, D.M., S.J., Witten, I.H. and Trujillo, M.F. (2004) Digital library access for illiterate users, Proceedings of the International Research Conference on Innovations in Information Technology (IIT 2004). 506-516. Dub.*
Video Mail Retrieval Using Voice, Nov. 10, 1997 (7 pages) http://mi.eng.cam.ac.uk/research/Projects/Video_Mail_Retrieval_Voice.
Nuance — News — Press Releases 2002 (2 pages) http://www.nuance.com/news/pressreleases/2002/200020521_voicepc.asp [Accessed Jan. 30, 2007].
International Search Report and Written Opinion; International Patent No. PCT/US2008/055963; Filed: Mar. 5, 2008; Applicant: Microsoft Corporation; Mailed on Jun. 27, 2008, 7 pages.
Djeraba, Chabane et al., "Concept-Based Query in Visual Information Systems," Fifth International Forum on Research and Technology Advances in Digital Libraries (ADL '98), 1998, 10 pages.

* cited by examiner

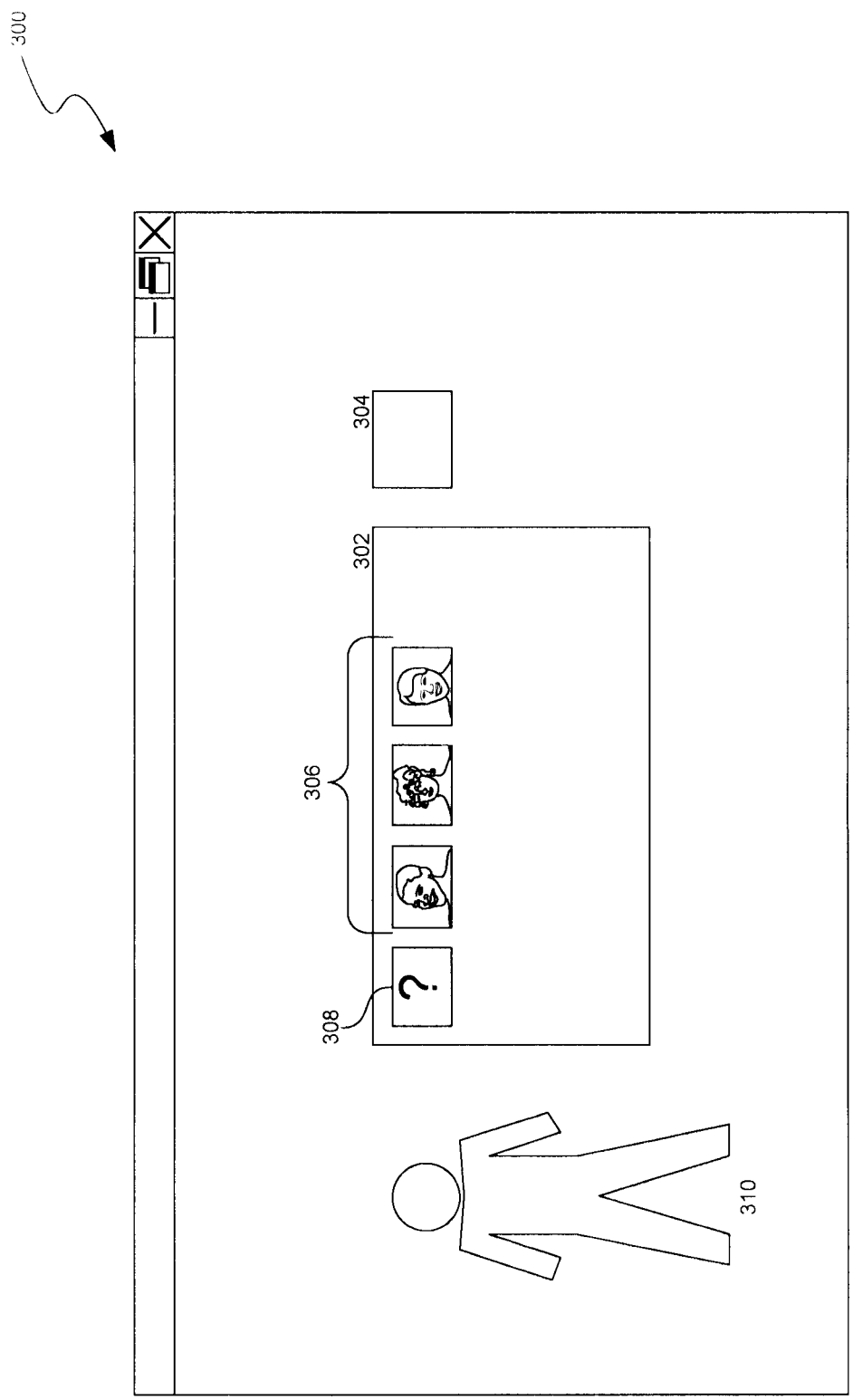

SIMPLIFIED ELECTRONIC MESSAGING SYSTEM

CROSS REFERENCE TO RELATED APPLICATION(S)

This application claims the benefit of Indian Patent Application No. 482/DEL/2007 entitled "SIMPLIFIED ELECTRONIC MESSAGING SYSTEM," filed on Mar. 5, 2007, which application is hereby incorporated by reference in its entirety.

BACKGROUND

Electronic mail ("e-mail") is commonly used to send and receive messages electronically. When using e-mail to send a message, a sender employs an e-mail client application software ("mail user agent") to compose and send the e-mail message. The e-mail message can include text and attachments. An attachment is a file that is sent with the e-mail, such as a picture, a video file, an audio file, a word-processing document, and so forth. The e-mail message specifies recipients for the message by indicating e-mail addresses to which the message should be delivered. An e-mail address is an identifier for a sender or recipient of an e-mail message. An e-mail message can also include other attributes, such as a subject.

When the sender indicates to a mail user agent ("MUA") to send the message, the MUA can employ one or more data communications protocols to send the e-mail message. A commonly employed protocol for sending e-mail is Simple Mail Transport Protocol ("SMTP"). The MUA employs SMTP to send the e-mail to a mail transport server. The mail transport server can be interconnected with other mail transport servers, such as via the Internet. The mail transport server can deliver e-mail it receives to the indicated e-mail addresses. If the indicated e-mail addresses correspond to another mail transport server, the mail transport server that received the message can cause the message to be forwarded to the other mail transport server. The recipient can employ an MUA to retrieve the e-mail message from the other mail transport server.

Sending and receiving e-mail messages can involve a significant amount of text. Senders and recipients type text into e-mail messages even though the messages may include attachments. Even though some MUAs offer graphical user interfaces ("GUIs") or other user interfaces ("UIs"), the GUIs are often complicated and text-intensive. Although there are over one billion e-mail addresses, an untapped market of e-mail users exists because in excess of 6.5 billion inhabit the Earth. Unfortunately, many of these people are not e-mail users because (1) they are illiterate or partially literate (jointly, "unliterate"); (2) are novice computer users; or (3) do not yet have access to computers.

SUMMARY

A simplified messaging system is provided. The simplified messaging system can provide MUA with a UI that is simpler than conventional UIs associated with MUAs and that enables illiterate and partially literate people to exchange e-mail messages with others. The simplified messaging system can enable users to log into the system by selecting images; select actions via icons or audio prompts; associate users with photos; compose and send e-mail messages; and receive and review e-mail messages with minimal textual input, if any. A user can log into the simplified messaging system by selecting an image (e.g., his or her photograph) and then selecting a sequence of images representing the user's password. Upon receiving a correct combination of images, the simplified messaging system can log in the user without requiring the user to type in text. The user can then view an inbox that provides a list of e-mail messages the user has received, such as e-mail messages the user has not yet viewed. The list may include images associated with each sender of the message and the type of message, such as audio/video message, audio message, ink message, text message, and so forth. When the user selects an e-mail message, the message can be rendered. The simplified messaging system can employ an electronic card, such as a "vCard" to identify senders photographically.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a user interface diagram illustrating a user interface provided by the simplified messaging system in some embodiments.

DETAILED DESCRIPTION

Figure 1:
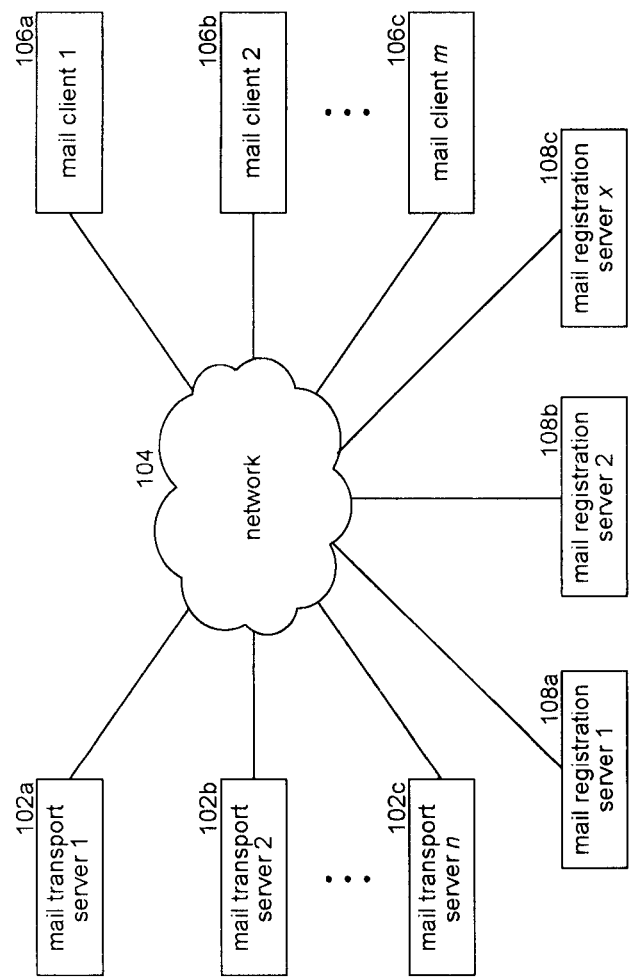
FIG. 1 is a block diagram illustrating an environment in which the simplified messaging system may operate in some embodiments.

A simplified messaging system is provided. In some embodiments, the simplified messaging system provides an MUA with a UI that is simpler than conventional UIs associated with MUAs and that enables illiterate and partially literate people to exchange e-mail messages with others. In various embodiments, the simplified messaging system enables users to log into the system by selecting images; select actions via icons or audio prompts; associate users with photos; compose and send e-mail messages; and receive and review e-mail messages with minimal textual input, if any. In various embodiments, a user can log into the simplified messaging system by selecting an image (e.g., his or her photograph) and then selecting a sequence of images representing the user's password. Upon receiving a correct combination of images, the simplified messaging system can log in the user without requiring the user to type in text.

The user can then view an inbox after logging in. The inbox provides a list of e-mail messages the user has received, such as e-mail messages the user has not yet viewed. The list may include images associated with each sender of the message and the type of message. As examples, the list may include a photograph corresponding to the sender of each message and an icon indicating whether the message is a video message, audio message, ink message, text message, and so forth. A video message contains audio/video or other multimedia content. An audio message contains audio content. An ink message contains an image, such as an image constructed via an electronic inking process. A sender can employ a stylus, mouse, keyboard, or other input device to create an ink image, such as by using a tablet-type computing device or a painting program on other computing devices. A text message contains text, such as would be associated with conventional e-mail messages. The simplified messaging system can also process other types of e-mail messages. When the user selects an e-mail message, the message is rendered. Rendering involves playing back audio or video, displaying an image, and so forth. The video portion of audio-video messages can be displayed on the screen associated with the computer on which the MUA operates, and the audio portion can be played back on speakers or a headset connected to the computer. Audio messages can also be played back on the speakers or headset. Ink messages can be displayed on the computer's screen. Text messages can be played back using text-to-speech, such as in the spoken language in which the text was composed. Alternatively, the text may be translated to another language with which the user is more familiar.

When the rendering completes, the simplified messaging system can automatically display a "reply" screen that enables the user to compose a reply. In some embodiments, the reply is composed using the same modality (e.g., video or audio) as the message that was rendered. When the original modality was text or ink the simplified messaging system may instead choose audio or video as the modality for the response. The simplified messaging system may then collect input from the user in the selected modality. As examples, the simplified messaging system can collect audio/video input, such as from a connected camera and microphone; audio input, such as from the microphone; ink input, such as from a stylus, mouse, or touch screen; or textual input, such as from a keyboard or speech-to-text software. The user may add additional recipients, such as by selecting images corresponding to people identified in a contact list and displayed in a list of possible recipients.

The list of possible recipients can be selected from a contact list. The contact list may grow as the user sends or receives messages. As examples, the user can add other users to the contact list or the simplified messaging system can automatically add senders and recipients to the contact list, such as when the user replies to a received message. Messages the simplified messaging system sends can include an electronic card attachment that enables data interchange. In some embodiments, the electronic card can be an attached file whose contents are defined in a "vCard" format. The electronic card can indicate name and address information, phone numbers, uniform resource locators (URLs), logos, photographs, and even audio or audio/video clips. When the simplified messaging system receives a message from a sender, it may employ information contained in the electronic card to display a photograph in the list of senders in the inbox or to add the sender's information to the user's contact list. When a user employs the simplified messaging system to send a message, the simplified messaging system may automatically attach a vCard identifying the user. In some embodiments, the user can associate an image with a sender when the user receives an e-mail message from the sender that does not indicate an image for the sender, such as in a vCard. As an example, the user may associate an image that the user selects from a library of images the simplified messaging system provides. When the user subsequently receives a message from the sender, the simplified e-mail system may display the selected image from the library in the user's inbox. In some embodiments, the list of messages in the inbox can be sorted visually, such as by using one or more computer vision techniques. An example of a computer vision technique employs concept-based queries, such as is described in Chabane Djeraba, Marinette Bouet & Henri Briand, "Concept-Based Query in Visual Information Systems," adl, p. 299, 1998, which is incorporated herein by reference in its entirety.

From the inbox, the user can also compose a new e-mail message. The user can select a modality for the message, such as audio/video, audio, ink, text, etc. The user can select recipients for the e-mail message from the contact list, such by selecting photographs associated with the desired recipients. If the user selects text as the modality, the MUA may display a text entry region (e.g., an "edit box") within which to type additional recipients' e-mail addresses. The simplified messaging system may then collect input from the user in the selected modality, such as by using the components described above in relation to replying to incoming messages. In some embodiments, the text entry region may appear when the user selects an icon representing an "unknown recipient," such as a recipient that is not already in the user's contact list. This icon may appear in the contact list, so that the user can select it instead of, or in addition to, other contacts.

In some embodiments, the simplified messaging system provides a registration process using which the user can register with the simplified messaging system. During the registration process, the user may provide an image to associate with the user, such as by employing a camera to capture the user's photograph and provide the captured photograph to the simplified messaging system. The user may then provide a password by selecting a combination of images, such as images depicting animals, shapes, or other inanimate objects. In some embodiments, the combination of images may be selected from multiple photographs, such as photographs of other users. The user can then provide information relating to the user's e-mail service. As examples, the user may provide the user's name, e-mail address, e-mail password, and so forth. This e-mail service information can be fairly complicated for novice computer users or unliterate people to provide, and so the user may seek the assistance of others in collecting and providing this e-mail information to the simplified messaging system. In some embodiments, users may interact with the simplified messaging system at a public facility at which a human operator is available to assist the users. The human operator may assist the users in creating new e-mail accounts, collecting this e-mail information, or providing this information to the simplified messaging system.

The simplified messaging system will now be described with reference to the figures. FIG. 1 is a block diagram illustrating an environment in which the simplified messaging system may operate in some embodiments. The environment includes one or more mail transport servers, such as mail transport server 102a, mail transport server 102b, and so forth. The mail transport servers may be interconnected via a network 104 to one or more mail client computing devices, such as mail client 106a, mail client 106b, and so forth. The network 104 may be an intranet, the Internet, or other type of networks. In various embodiments, the environment may include additional networks. The mail transport servers and the mail clients may be connected via the network to one or more mail registration servers, such as mail registration server 108a, mail registration server 108b, and so forth.

The mail transport server may be any conventional mail transport server such as an SMTP server, MICROSOFT EXCHANGE, or other mail transport servers. In various embodiments, the mail transport server can receive e-mail messages from other mail transport servers, store the received e-mail messages, and provide the stored e-mail messages to mail clients, such as when a user employs an MUA to receive e-mail. The mail transport server may also store contact lists for retrieval and use by the mail clients.

A mail client is a computing device comprising various hardware and software components, as is described in further detail below in relation to FIG. 2A. The mail client can be a general purpose or a special purpose computing device.

A mail registration server is a computing device that stores e-mail-related information associated with the simplified messaging system. The mail registration server is described in further detail below in relation to FIG. 2B.

The computing devices on which the simplified messaging system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the simplified messaging system. In addition, the data structures and message structures may be stored or transmitted via a data transmission medium, such as a signal on a communications link. Various communications links may be employed, such as the Internet, a local area network, a wide area network, or a point-to-point dial-up connection.

The simplified messaging system may use various computing systems or devices including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The simplified messaging system may also provide its services to various computing systems, such as personal computers, cell phones, personal digital assistants, consumer electronics, home automation devices, and so on.

The simplified messaging system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2A:
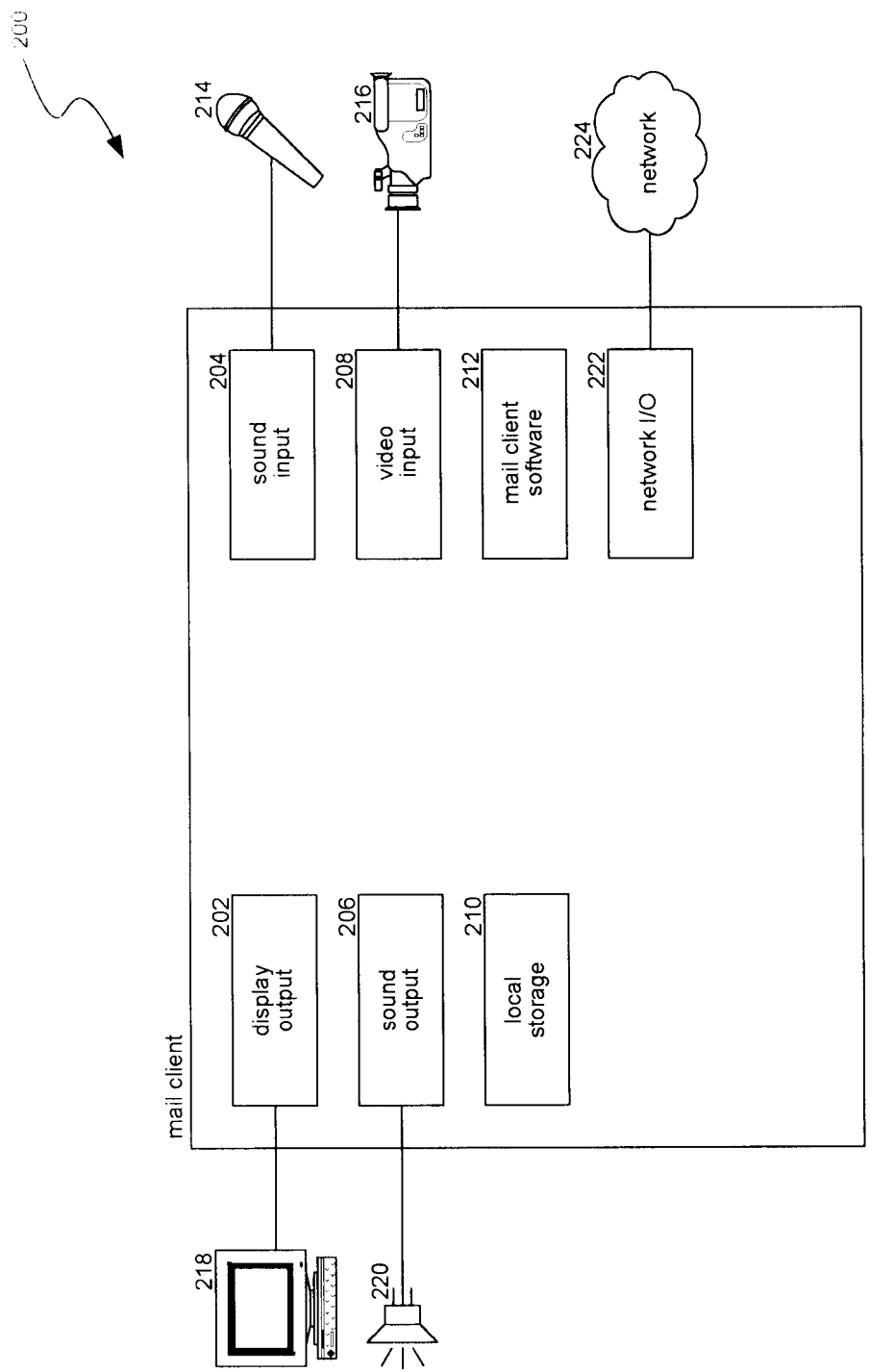
FIG. 2A is a block diagram illustrating a mail client employed by the simplified messaging system in some embodiments.

FIG. 2A is a block diagram illustrating a mail client 200 employed by the simplified messaging system in some embodiments. The mail client is a computing device that includes various hardware and software components that facilitate operation of the simplified messaging system. The mail client can be implemented as a general purpose computing device or a special purpose computing device that is configured to operate with these hardware and software components. In various embodiments, the hardware and software components include a display output component 202, sound input component 204, sound output component 206, video input component 208, local storage component 210, mail client software component 212, and a network input/output component ("I/O") 222. The display output component 202 can output text, videos, images, and so forth on an output device, such as a computer monitor 218. The sound input component 204 can receive and digitize sound, such as a sound that is received by a microphone 214. The sound output component 206 can emit digitized sounds, such as via a speaker 220 or a headset. The video input component 208 can receive and store inputs that are received via a video capture device, such as a camcorder 216, digital camera, scanner, and so forth. The local storage component 210 can store sounds, videos, images, text, and so forth. The mail client software component 212 is an MUA associated with the simplified messaging system. The mail client software is described in further detail below. The network input/output component 222 may enable the mail client to communicate with other computing devices, such as via a network 224.

Figure 2B:
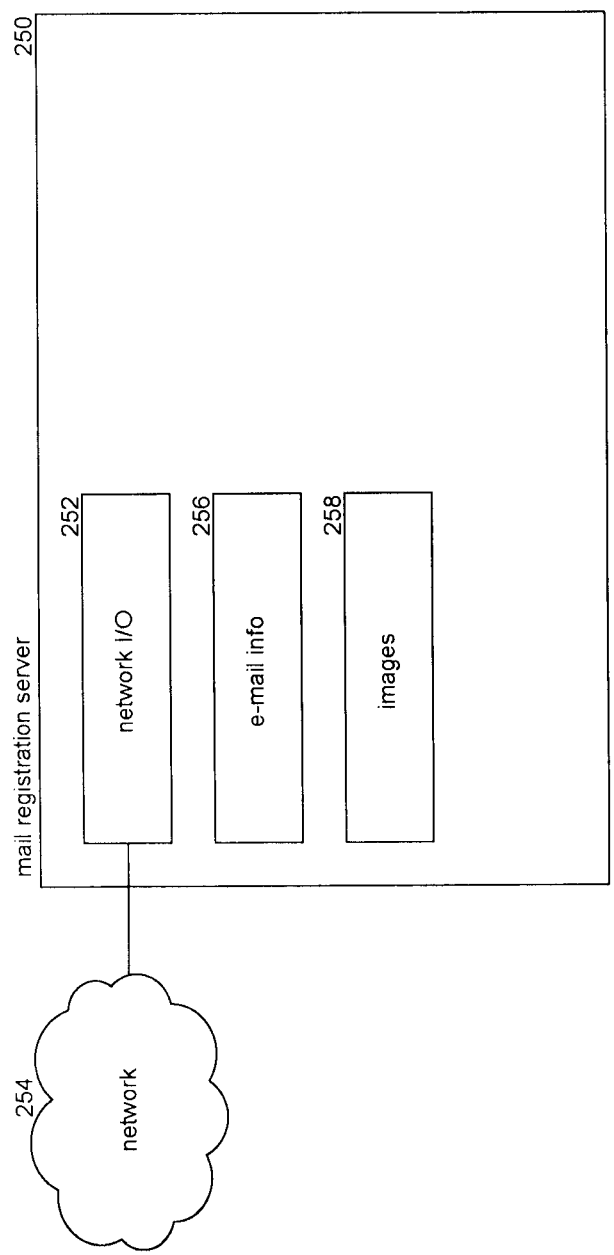
FIG. 2B is a block diagram illustrating a mail registration server employed by the simplified messaging system in some embodiments.
Figure 10:
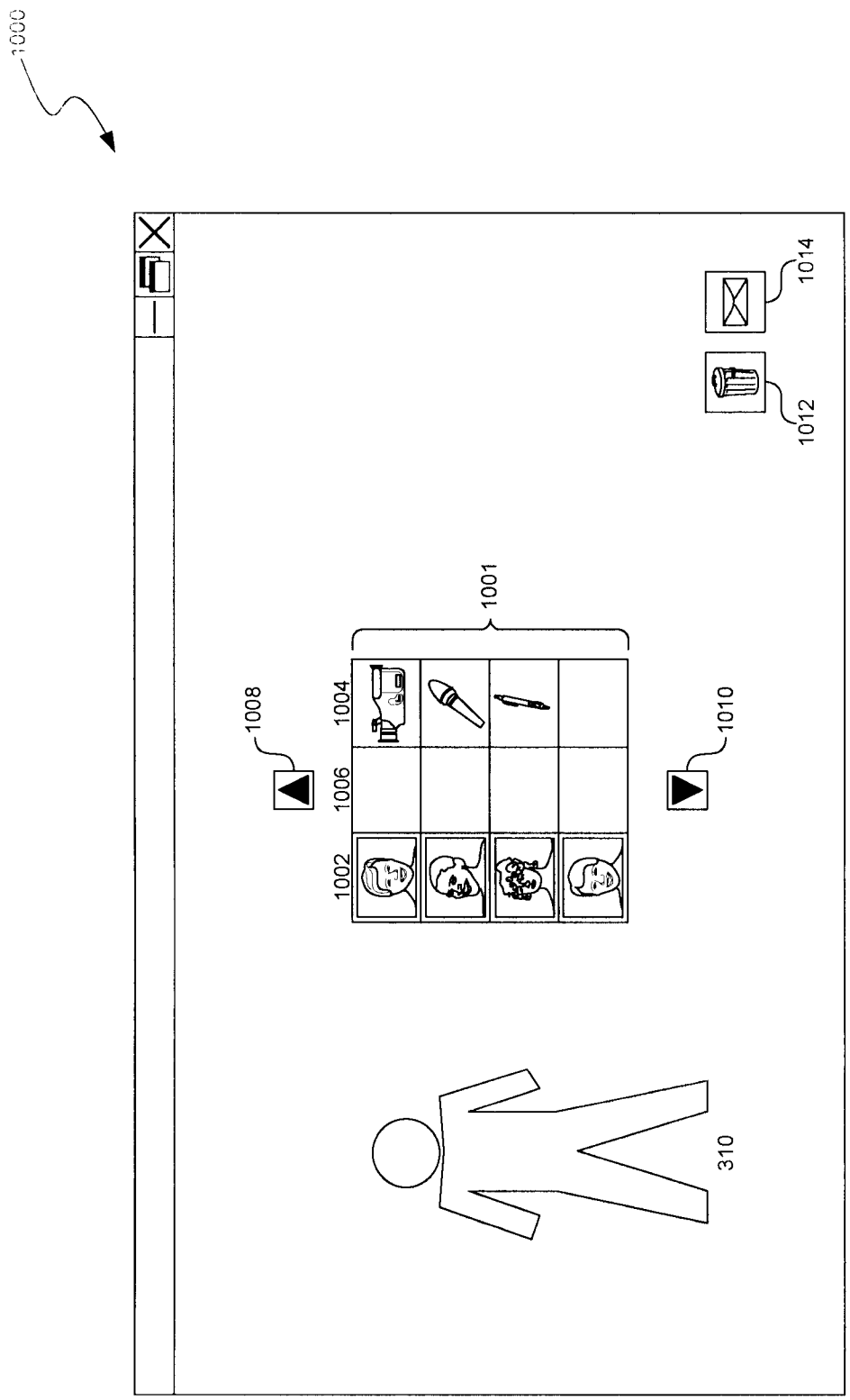
FIGS. 10-12 are user interface diagrams illustrating user interfaces provided by the simplified messaging system in various embodiments.

FIG. 2B is a block diagram illustrating a mail registration server employed by the simplified messaging system in some embodiments. The mail registration server can be implemented as a general purpose or a special purpose computing device. A mail registration server 250 includes various hardware and software components. As examples, the mail registration server includes a network I/O component 252 that may enable the mail registration server to communicate with other computing devices, such as via a network 254. The mail registration server can also include e-mail-related information 256. As an example, the mail registration server can include e-mail information that is stored in a database table format, such as is illustrated in FIG. 10 and described in detail below. The mail registration server can also include various images 258, such as images corresponding to a user's identification and password.

FIG. 3 is a user interface diagram illustrating a user interface provided by the simplified messaging system in some embodiments. The user interface 300 may be provided by an MUA associated with the simplified messaging system. The UI may include an assistant character 310 that can provide assistance when needed or requested by the user. As an example, the user may select the assistant by using a mouse pointer, touch screen, or other user interface component. The assistant may provide context-sensitive help. As an example, when the user is viewing a login page, the assistant may provide information about logging in or registering. When the user is viewing an inbox, the assistant may provide information about rendering a message or composing a new message. The assistant may provide general assistance about a page or specific information about user interface elements appearing on the page. As an example, when the user is viewing an inbox, the assistant may provide information relating to how to view, hear, or read messages in the inbox. It may also explain that by selecting an icon for composing an e-mail message, the user can employ various mechanisms or modalities to compose the message. In some embodiments, the user can receive other audible help by selecting various user interface elements. In some embodiments, the assistant can provide help audibly and visually, such as by providing an audible instruction while also highlighting a portion of a display. The assistant can provide assistance, demonstrations, and tutorials relating to navigational UI elements or other aspects of the simplified messaging system.

The user interface 300 can include a region 302 that the user can use to identify himself or herself. The region 302 can include one or more images 306 wherein each image corresponds to a registered user. If the user recognizes the user's image, the user can select the image. If the user has not yet registered, the user can select a registration icon 308. If the user selects an image that identifies the identifying user, the identifying image may appear in region 304. The user may then continue with the login process, which is described in further detail below in relation to FIGS. 5A-5B.

Figure 4:
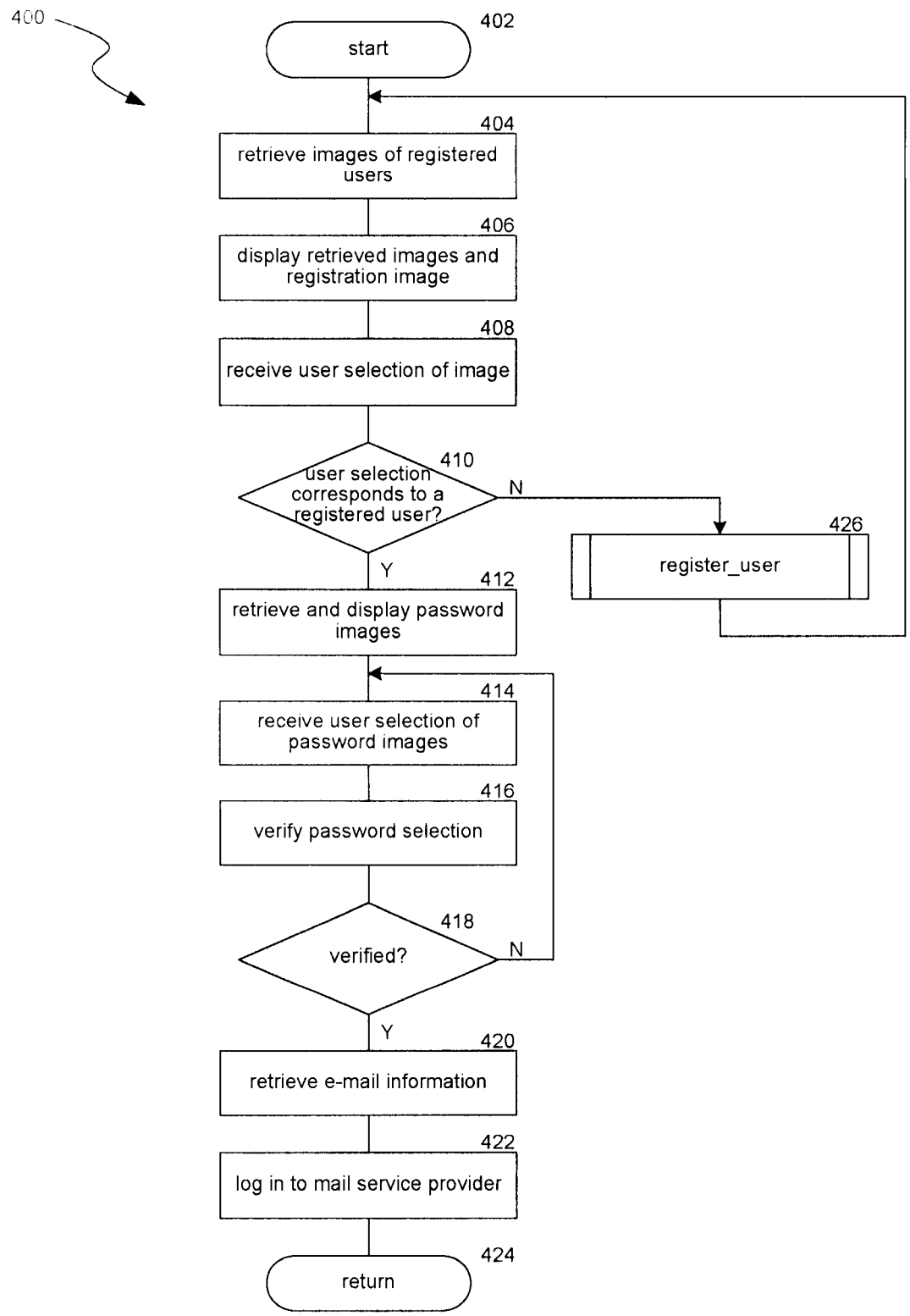
FIG. 4 is a flow diagram illustrating a login routine invoked by the simplified messaging system in some embodiments.

FIG. 4 is a flow diagram illustrating a login routine 400 invoked by the simplified messaging system in some embodiments. The simplified messaging system may invoke the login routine 400 to enable the user to log in. The routine begins at block 402.

At block 404, the routine retrieves images of registered users, such as from local storage 210 or images store 258, which are illustrated in FIGS. 2A-2B and described above. At block 406, the routine displays the retrieved images and a registration image, such as images 306 and registration icon 308 illustrated in FIG. 3 and described above. At block 408, the routine receives a user's selection of an image. As an example, the routine may receive the image the user selected from images 306 illustrated in FIG. 3 and described above.

At decision block 410, the routine determines whether the user's selection corresponds to a registered user. As an example, the routine may determine that the selection does not correspond to a registered user when the user selects the registration icon 308 illustrated in FIG. 3. If the user's selection corresponds to a registered user, the routine continues at block 412, otherwise the routine continues at block 426. The routine then continues at block 404.

At block 412, the routine retrieves and displays password images. Display and selection of password images are described in further detail below in relation to FIGS. 5A-5B. In general, the simplified messaging system may display multiple images of various objects and request the user to select among the displayed images. As an example, the simplified messaging system may display 20 images and request the user to select three of the 20 images. At block 414, the routine receives the user's selection of password images. At block 416, the routine verifies the user's password selection. As an example, the routine may determine whether the user selected the set of images previously identified as the password for the identified user. In some embodiments, the password images may need to be selected by the user in the same order in which they were selected when the user first registered with the simplified messaging system.

At decision block 418, the routine determines whether the user selected the appropriate set of password images. In some embodiments, the user may need to select the password images in the same order as they were selected as the password images. In some embodiments, other password selection means can be used that do not require the entry of text. Alternatively, the MUA may enable the user to enter text, such as when the user becomes more facile with the MUA or increases his or her literacy. If the password is verified, the routine continues at block 420. Otherwise, the routine may continue at block 414. In some embodiments, the routine may enable the user to attempt to identify the password images a specified number of times. If the user incorrectly identifies the password images the specified number of times, the routine may prevent the user from logging in such as for a period of time.

At block 420, the routine retrieves e-mail information associated with the user. As an example, the routine may retrieve the information from the e-mail information storage 256 illustrated in FIG. 2 and described above. At block 422, the routine may attempt to log in to the mail service provider, such as by employing the e-mail information retrieved at block 420. Logging into a server or device causes the server or device to authenticate the user, such as by verifying the combination of user identity and password. The routine then returns at block 424.

Those skilled in the art will appreciate that the logic illustrated in FIG. 4 and described above, and in each of the flow diagrams discussed below, may be altered in a variety of ways. For example, the order of the logic may be rearranged, substeps may be performed in parallel, illustrated logic may be omitted, other logic may be included, etc.

Figure 5A:
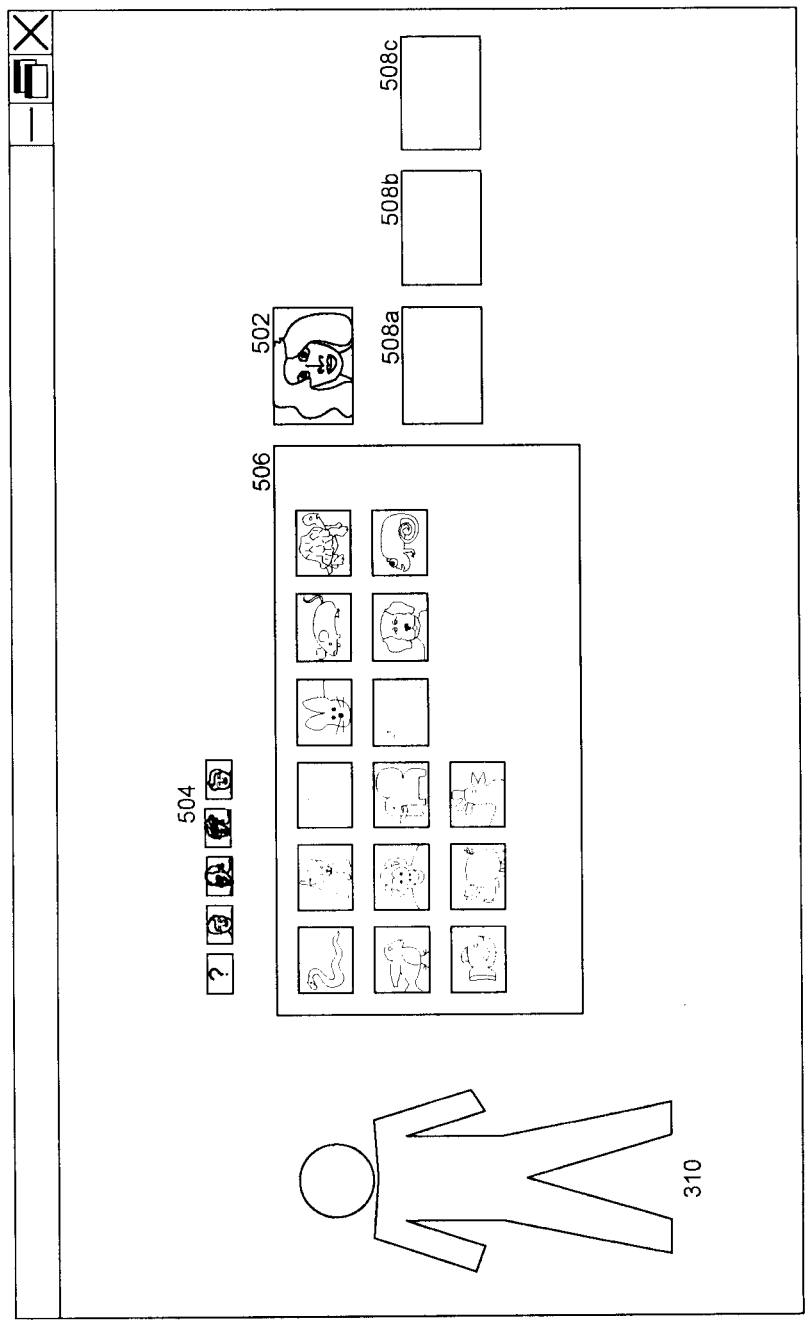
FIGS. 5A-7 are user interface diagrams illustrating user interfaces provided by the simplified messaging system in various embodiments.

FIGS. 5A-7 are user interface diagrams illustrating user interfaces provided by the simplified messaging system in various embodiments. FIG. 5A is a user interface diagram illustrating a user interface 500 that a user can use to log in to the simplified messaging system. The user interface 500 displays an image that the user previously selected to identify himself or herself in region 502. If the selected image was incorrect, the user can employ region 504 to select an alternate image or select an image that begins a registration process. In region 506, the user interface displays multiple images of objects, such as animals, shapes, or other inanimate objects. The user can select a sequence of the displayed images. The simplified messaging system may then display in regions 508a, 508b, and 508c the images selected from region 506 in the order in which they were selected. Although three regions 508a-508c are displayed, the simplified messaging system may display fewer or additional regions to display the password-related images.

Figure 5B:
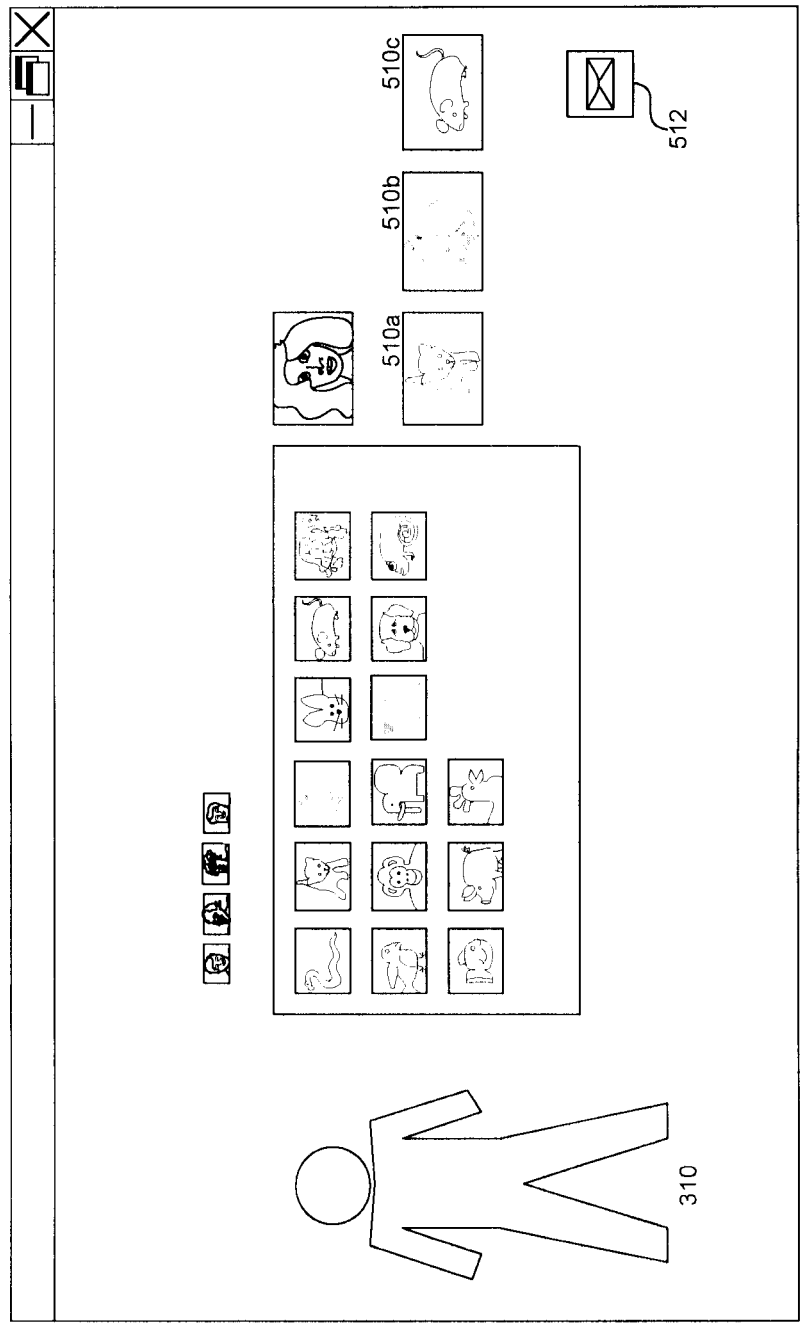

FIG. 5B is a user interface diagram illustrating a user interface that is similar to the user interface diagram illustrated above in relation to FIG. 5A. However, in the user interface diagram illustrated in FIG. 5B, the user has selected three password-related images. These password-related images are displayed in regions 510a, 510b and 510c. Once the simplified messaging system verifies that the provided password is correct, it may display an icon in region 512 that enables the user to continue to the user's inbox. In some embodiments, the simplified messaging system may proceed to the user's inbox without requiring the user to select the icon it displays in region 512. In some embodiments, the user interface may provide a text entry region to enable the user to type in a password instead of, or in addition to, selecting password-related images.

Figure 6:
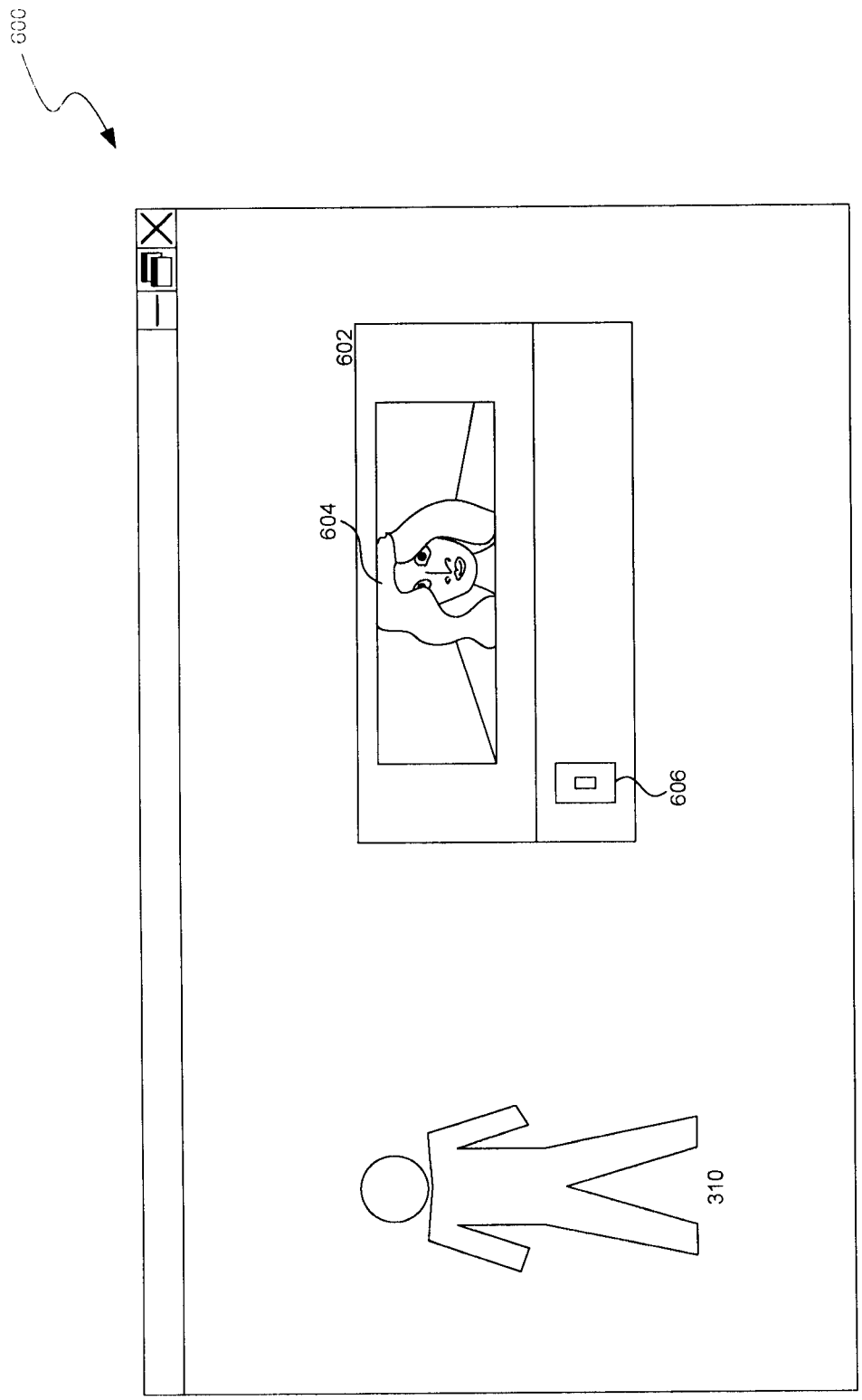

FIG. 6 is a user interface diagram illustrating a user interface 600 provided by the simplified messaging system in some embodiments. The user interface 600 includes a region 602 in which a user that is registering can provide the user's photograph or other image 604. Upon providing the photograph or other image, the user can select a push button 606 to capture and store the provided image. In some embodiments, the user can select an image from a library of images instead of, or in addition to, providing a photograph. The user interface can be a portion of a user registration wizard.

Figure 7:
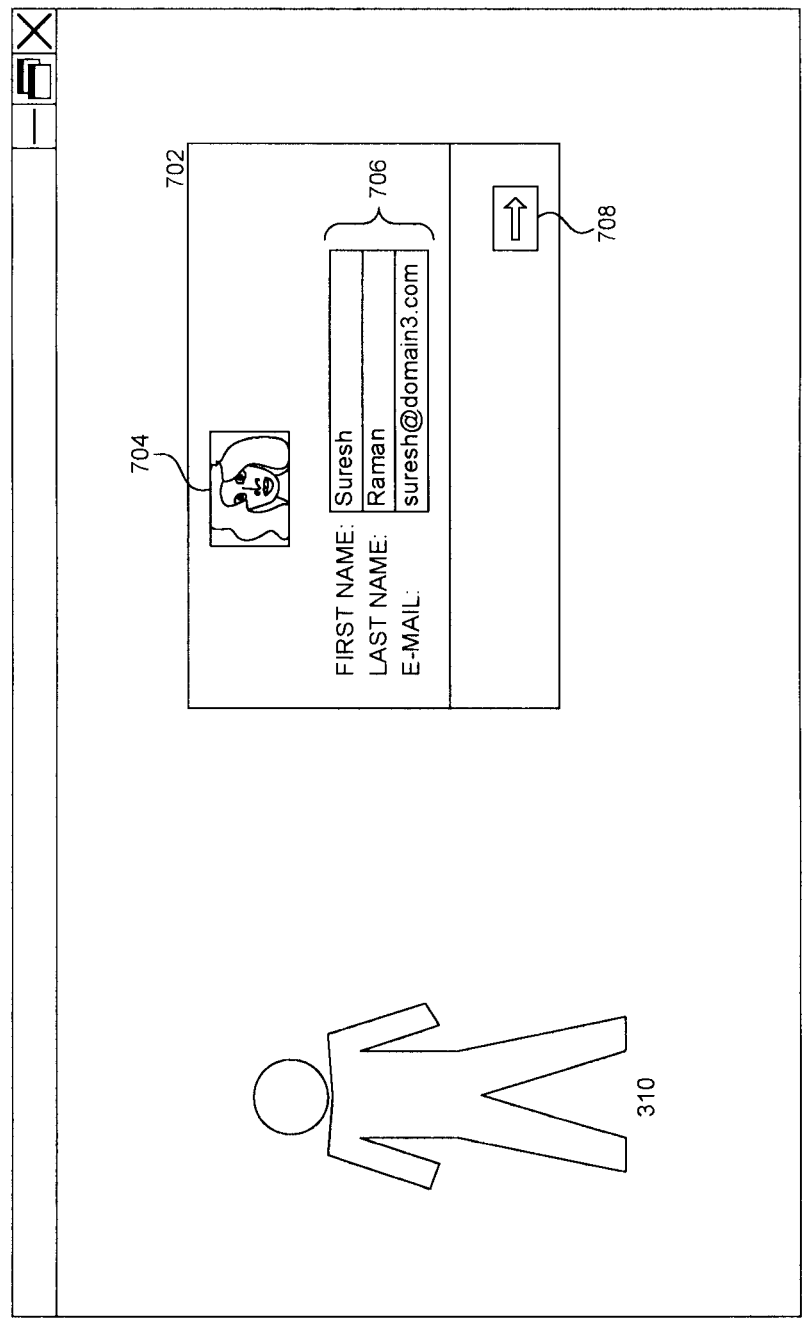

FIG. 7 is a user interface diagram illustrating a continuation of the user registration wizard. A user interface 700 includes a region 702 in which the user can view the image or photograph 704 the user will select when logging into the system later. The region 702 also includes e-mail-related information 706. Examples of e-mail-related information include the user's name, e-mail address, and so forth. In some embodiments, the user may seek the assistance of another person to collect and provide the e-mail-related information. The user can then select a button 708 to continue the registration process.

Figure 8:
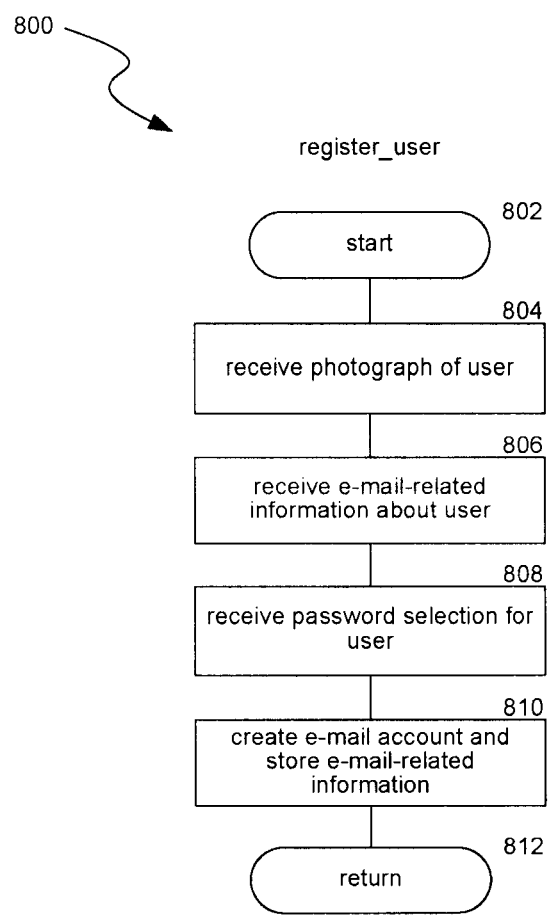
FIG. 8 is a flow diagram illustrating a register_user routine invoked by the simplified messaging system in some embodiments.

FIG. 8 is a flow diagram illustrating a register_user routine 800 invoked by the simplified messaging system in some embodiments. The routine 800 begins at block 802. At block 804, the routine receives an image of a user, such as a photograph. At block 806, the routine receives e-mail-related information about the user. As an example, the routine may receive the user's name, e-mail address, and password. The password may relate to the e-mail service provider or e-mail account that will be used to transmit and receive e-mail messages (e.g., and not the password associated with the simplified messaging system). At block 808, the routine receives a password selection for the user. As an example, the routine may receive a sequence of images that the user associates with his or her password. At block 810, the routine creates an e-mail account for the user and stores the received e-mail-related information, such as in a storage associated with the simplified messaging system. At block 812, the routine returns.

Figure 9:
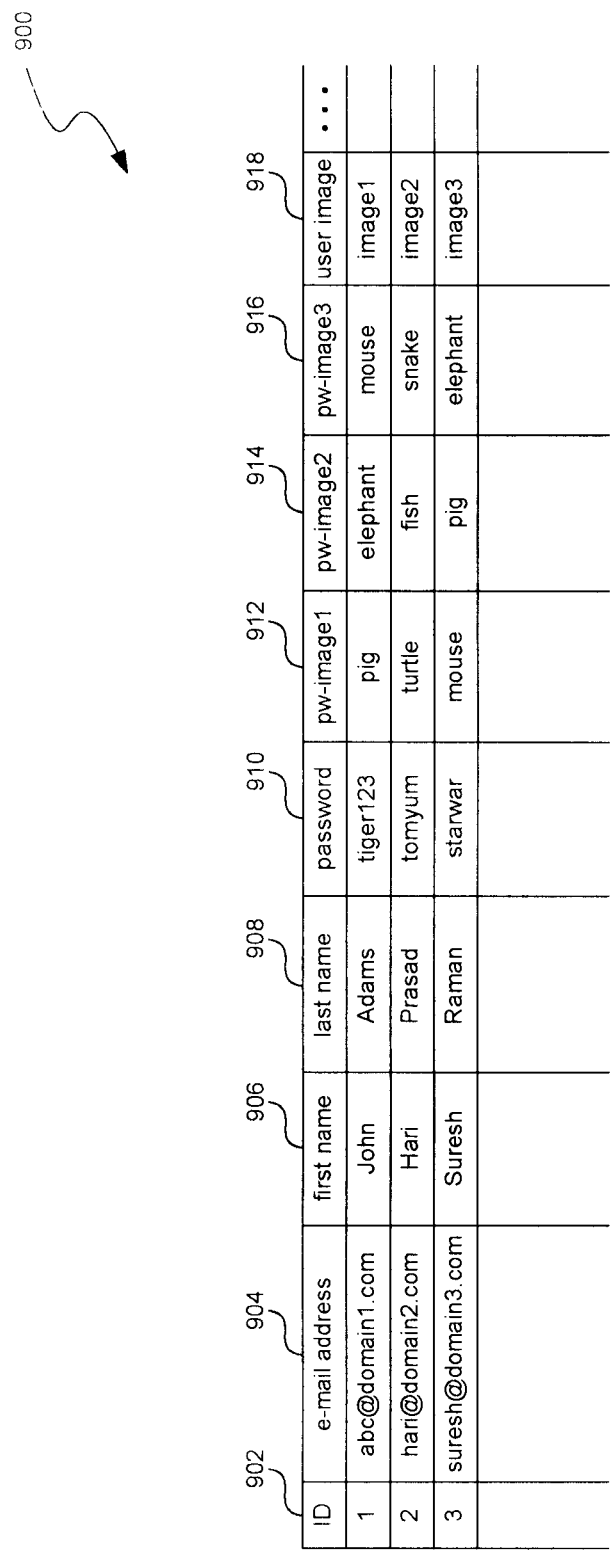
FIG. 9 is a table diagram illustrating e-mail information stored by the simplified messaging system in some embodiments.

FIG. 9 is a table diagram illustrating e-mail information stored by the simplified messaging system in some embodiments. A table 900 can store e-mail-related information, such as an ID 902, e-mail address 904, first name 906, last name 908, password 910, password images 912, 914, and 916, and a user image 918. The table may be stored in a database or other storage, such as in the e-mail-related information component 256, which is illustrated in FIG. 2B and described above. The simplified messaging system may employ the ID for various internal purposes, such as for database lookups. The e-mail address is associated with a user. The simplified messaging system may employ the e-mail address and the password to connect to a mail transport server or other server to retrieve e-mail messages sent to the user or to send e-mail messages the user composes. The password images 912, 914, and 916 may indicate the images a user has selected corresponding to the user's password. The user may employ these images when logging into the simplified messaging system. The user image indicates an image that is associated with the user, e.g., an image that the user employs to identify himself or herself when logging into the simplified messaging system.

While FIG. 9 shows a table whose contents and organization are designed to make them more comprehensible by a human reader, those skilled in the art will appreciate that actual data structures used by the simplified messaging system to store this information may differ from the table shown, in that they, for example, may be organized in a different manner, may contain more or less information than shown, may be compressed and/or encrypted, etc.

Figure 11:
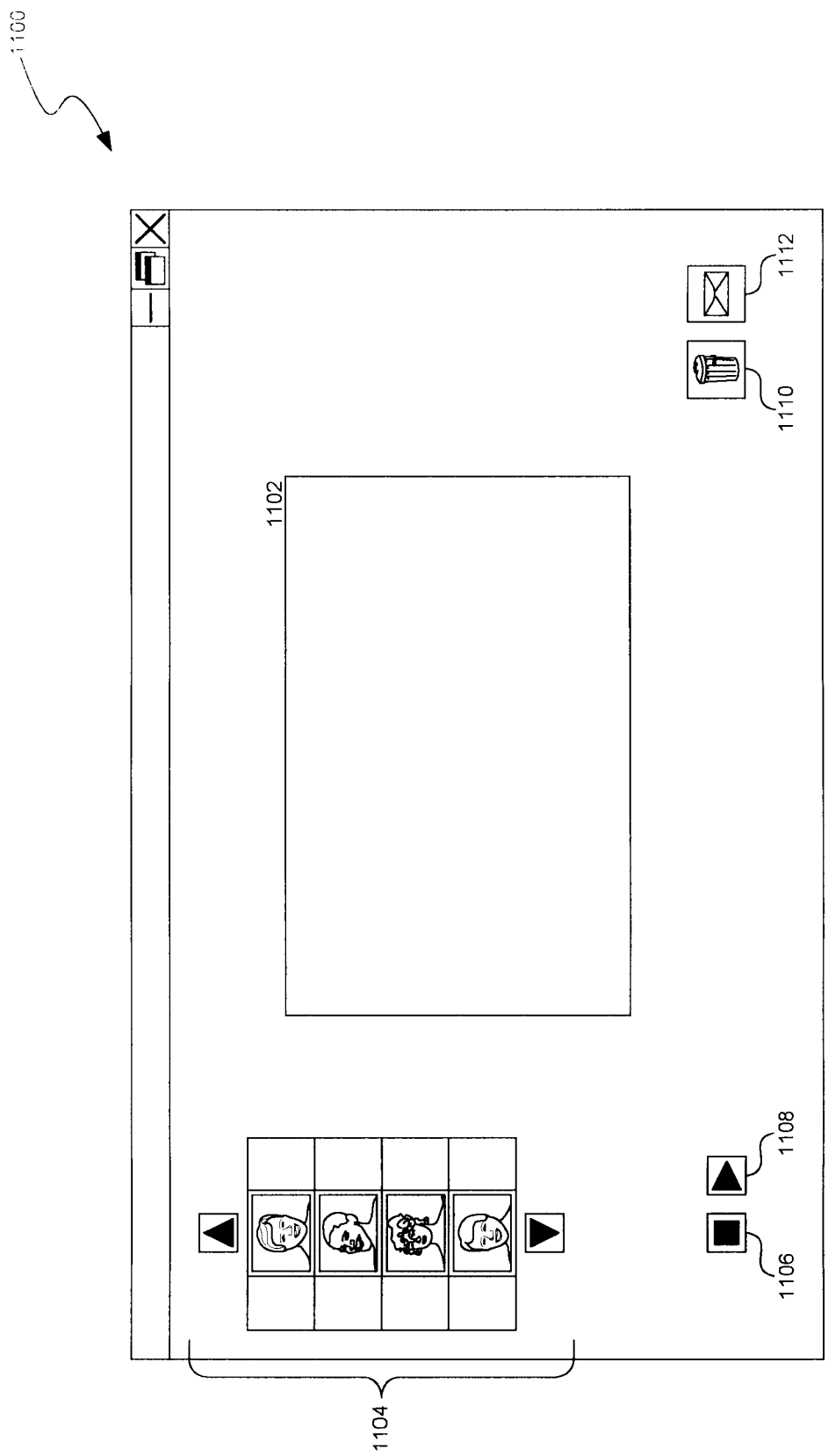
Figure 12:
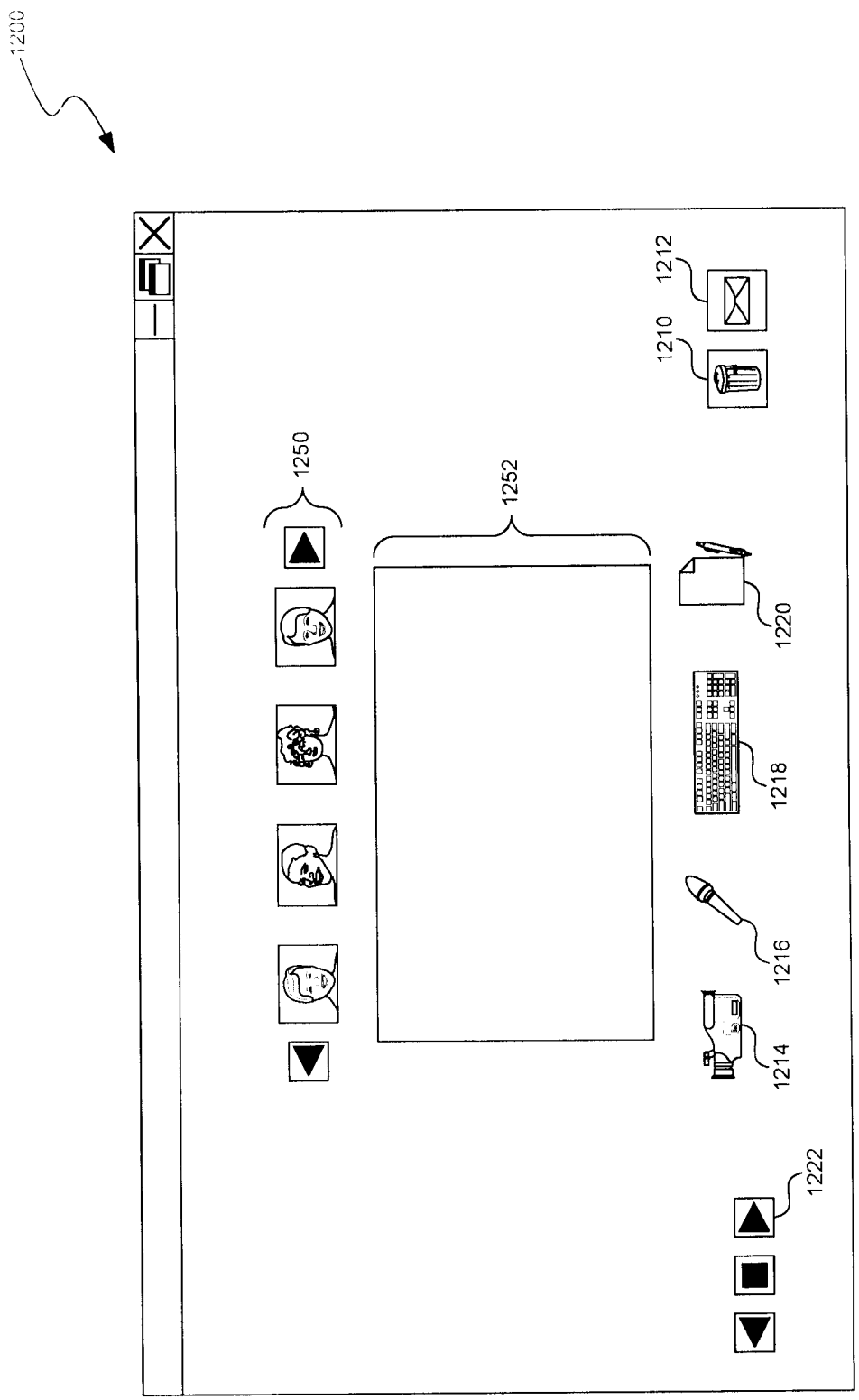

FIGS. 10-12 are user interface diagrams illustrating user interfaces provided by the simplified messaging system in various embodiments.

FIG. 10 is a user interface diagram illustrating a user interface 1000 provided by the simplified messaging system. In some embodiments, the user interface 1000 includes a region 1001 that provides a list of e-mail messages, such as e-mail messages the user has received or sent. In some embodiments, the region 1001 provides a list of e-mail messages that the user has received. The region may include a column 1002 containing photographs or other images associated with the senders of the messages. The region 1001 may also include a column 1004 indicating the type of each message. As examples, the types of messages may be audio/video, audio, text, ink, etc. The region 1001 may also include a column 1006 providing details relating to the message, such as a subject, date the message was sent, etc. When the user selects these details, the simplified messaging system may in some embodiments employ text-to-speech to audibly render the details. The user interface may also provide navigation buttons 1008 and 1010 so that the user can review messages that are listed before or after the portion of the list that is displayed. The user interface may also include an icon 1012 for deleting selected messages and an icon 1014 for composing new messages. When a user selects an e-mail from region 1001, the simplified messaging system may cause that e-mail to be rendered, such as in a video, audio, or other format indicated by the modality associated with the e-mail message and displayed in column 1004.

FIG. 11 is a user interface diagram illustrating a user interface 1100 provided by the simplified messaging system in some embodiments to enable a user to view an incoming message. The user interface 1100 includes a region 1102 in which a video may play. The illustrated user interface may be employed by the simplified messaging system when the e-mail the user selects to view contains a video. The user interface may include a list of e-mail messages in the inbox in region 1104. Thus, the user can quickly navigate to other e-mail messages. Alternatively, the region 1104 may be used to display contacts indicated by the user's contact list. The user interface can include buttons 1106 and 1108 that enable the user to play the video or stop the video, respectively. Other buttons for video navigation can also be provided, such as rewind, forward, pause, etc. The user interface can include an icon 1110 for enabling the user to delete the message. The user interface may also include an icon 1112 to enable the user to compose a reply to the message. In some embodiments, once the video has played, the simplified messaging system automatically provides a reply screen that the user can use to compose a reply to the reviewed message.

FIG. 12 is a user interface diagram illustrating a user interface 1200 provided by the simplified messaging system in some embodiments to enable a user to compose an e-mail message or to reply to an e-mail message. The user interface 1200 may include a region 1250 that the user can employ to select recipients for the message. The user interface may also include a region 1252 that displays a larger representation of the image selected from region 1250. The user interface may also include a record button 1222 that the user can employ to begin recording a message. The user interface may include buttons 1214, 1216, 1218, and 1220 to enable the user to select the modality for the message (e.g., illustrated as audio/video, audio, text, and ink, respectively). When the user is composing a message, the user may be able to select a modality. When the user is responding to a message, the simplified messaging system may automatically select the modality based on the modality of the message the user reviewed. Examples of modalities that the user can select include audio/video 1214, audio 1216, keyboard 1218, and ink 1220. When the received message is text or ink, the simplified messaging system may automatically select the audio/video or audio modality. The user interface can include an icon 1210 for enabling the user to delete the message. The user interface may also include an icon 1212 to enable the user to compose a In some embodiments, the simplified messaging system provides "audio tags." An audio tag is an audio clip. When the user selects a UI element, such as by hovering a mouse pointer over the UI element or selecting it on a touch screen, the simplified messaging system can render the audio clip. The audio clip may explain what the UI element does or actions the user may need to take. Thus, the simplified messaging system may provide audio-based assistance to users. The simplified messaging system may provide audio tags in addition to the assistant feature described above.

In some embodiments, the simplified messaging system enables users to interact with it using a "single action," such as clicking a mouse button, touching a region of a touch screen, etc. In some embodiments, the user does not need to employ context menus (e.g., menus that are selected by clicking the right-hand button of a mouse) or other complicated user interface features.

In some embodiments, the simplified messaging system may function in a federated model. In the federated model, a user can log into different e-mail client computing devices and interact with the simplified messaging system in ways similar to a client computing device that the user previously used, such as when registering with the simplified messaging system.

In some embodiments, the simplified messaging system may send all content created by the user when sending an e-mail message as attachments to the message. Various e-mail message formats can be employed, such as SMTP, MICROSOFT mail format employed with MICROSOFT Mail Application Program Interface ("MAPI"), and so forth.

In some embodiments, the UI of the MUA associated with the simplified messaging system may change over time, such as with the increased sophistication of the novice user or literacy of the unliterate user.

In various embodiments, the simplified messaging system can be employed with e-mail, instant messaging, Internet chat, computer-facilitated telephony, and other messaging-related applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computer system for enabling simplified user authentication, comprising:
   receiving a selection of a photograph of a user, the photograph representing an identification for the user, the photograph previously provided by the user, wherein the use of the photograph to identify the user initiates a process configured for user login by illiterate or partially literate users;
   receiving a selection of multiple images representing a password for the user, the multiple images previously selected by the user;
   authenticating the user based on the selected photograph of the user representing the identification for the user and the selected multiple images representing the password for the user;
   rendering an incoming message as an audio or video sequence;
   determining, based on the use of the photograph to identify the user, that the user is illiterate or partially literate;
   in response to determining that the user is illiterate or partially literate, automatically displaying a message reply page upon completing rendering the incoming message, without input from the user indicating to compose a reply to the rendered incoming message; and
   in response to determining that the user is illiterate or partially literate, causing a message to be composed without presenting text for user review and without receiving textual input from the user.

2. The method of claim 1 further comprising receiving a message containing text and providing the text in audio form by employing text-to-speech.

3. The method of claim 1 further comprising verifying that the selected multiple images representing the password for the user correspond to a stored association between identification images and password images wherein the verifying includes determining whether the password images selected during logging in were selected in a same order as previously selected by the user.

4. The method of claim 1 further comprising registering with an electronic messaging system wherein the registering includes providing an image representing the identification for the user.

5. The method of claim 1 further comprising registering with an electronic messaging system wherein the registering includes providing a photograph representing the identification for the user and multiple images representing the password for the user.

6. The method of claim 1 further comprising receiving audible assistance from an assistant character.

7. The method of claim 1 further comprising providing a list of messages stored in an inbox wherein each item in the list includes an image corresponding to a sender of a message associated with the item.

8. The method of claim 1 further comprising providing a list of messages stored in an inbox wherein each item in the list includes an image corresponding to a sender of a message associated with the item and the image is retrieved from an electronic card.

9. The method of claim 1 further comprising sorting a list of messages stored in an inbox wherein each item in the list includes an image corresponding to a sender of a message associated with the item and the list is sorted according to contents of each included image.

10. A system for enabling simplified use of electronic messaging, comprising:
    a mail transport server that receives and forwards electronic messages;
    a mail registration server comprising an images component that stores images associated with user identifications and user passwords wherein an identification image for a user is a photograph of the user; and
    a mail client comprising a video input and a display output that receives a selection of a photograph identifying a user, wherein the use of the photograph to identify the user initiates a process configured for user login by illiterate or partially literate users, the login process comprising:
        receiving multiple images associated with a password of the user, and
        logging the user into an electronic messaging system when the selected photograph identifying the user and the multiple images associated with the password of the user correspond to a previously selected combination of identifying photograph and password images;
    wherein the mail client is further configured to, after logging the user into the electronic messaging system:
        determine, based on the received photograph, that the user is illiterate or partially literate;
        render an incoming message,
        in response to determining that the user is illiterate or partially literate, automatically display a message reply page upon completing rendering the incoming message without user input indicating to compose a reply to the rendered incoming message, and
        in response to determining that the user is illiterate or partially literate, causing a message to be composed without presenting text for user review and without receiving textual input from the user.

11. The system of claim 10 wherein the mail client further comprises a mail client software that provides incoming electronic messages to a user and receives outgoing electronic messages from the user wherein the mail client software automatically attaches an electronic card to the outgoing electronic messages, the electronic card including the image identifying the user.

12. The system of claim 10 wherein the mail registration server further comprises electronic mail information wherein the electronic mail information includes a photograph identifying the user and multiple password images associated with the password of the user.

13. The system of claim 10 wherein the mail registration server wherein the images component stores multiple images from which a user can select images to associate with a password for the user.

14. The system of claim 10 wherein the mail registration server wherein the images component stores multiple images from which a user can select images to specify a password for the user and the multiple images associated with the password of the user must be selected during login in a same order in which they were previously specified.

15. A computer-readable storage device storing computer-readable instructions that, when executed, cause a computer system to perform operations for enabling simplified use of electronic messaging, the operations comprising:
receiving a photograph to identify a user, wherein the use of the photograph to identify the user initiates a process configured for user login by illiterate or partially literate users;
receiving electronic messaging information associated with a messaging account, the messaging information including at least a first password without which electronic messages cannot be accessed from a mail service provider;
receiving a selection of multiple images to associate with a second password for the user; and
upon receiving the photograph to identify the user and an indication from a second set of multiple password images a subset of the password images,
determining whether the selected subset of the password images matches previously stored password images associated with the selected photograph to identify the user; and
determining based on the photograph that the user is illiterate or partially literate,
when the selected subset of the password images matches previously stored password images associated with the selected photograph to identify the user,
logging into the mail service provider using the first password to retrieve an electronic message,
rendering an incoming message,
in response to determining that the user is illiterate or partially literate, automatically displaying a message reply page upon completing rendering the incoming message, without input from the user indicating to compose a reply to the rendered incoming message, and
in response to determining that the user is illiterate or partially literate, causing a message to be composed without presenting text for user review and without receiving textual input from the user.

16. The computer-readable storage device of claim 15 wherein the first password includes only text and the second password includes no text.

17. The computer-readable storage device of claim 15 further comprising automatically adding a contact to a list of contacts when the user responds to an incoming electronic message, the adding including associating an image with the contact wherein the image is retrieved from an electronic card attached to the incoming electronic message.

18. The computer-readable storage device of claim 15 including providing an assistant character that provides help audibly and visually.

* * * * *